(12) United States Patent
Bishop (10) Patent No.: US 12,102,080 B2
(45) Date of Patent: Oct. 1, 2024

(54) COLLAPSIBLE INSECT SWATTER

(71) Applicant: Casey Bishop, Redding, CA (US)

(72) Inventor: Casey Bishop, Redding, CA (US)

( * ) Notice: Subject to any disclaimer, the term of this patent is extended or adjusted under 35 U.S.C. 154(b) by 0 days.

(21) Appl. No.: 17/721,153

(22) Filed: Apr. 14, 2022

(65) Prior Publication Data

US 2023/0329216 A1  Oct. 19, 2023

(51) Int. Cl.
*A01M 3/02*  (2006.01)

(52) U.S. Cl.
CPC ..................... *A01M 3/02* (2013.01)

(58) Field of Classification Search
CPC ......... A01M 3/02; A01M 43/137; B25G 1/04; B25G 3/04; B25G 3/30
USPC ............. 43/137; 16/422, 427, 429; D22/124
See application file for complete search history.

(56) References Cited

U.S. PATENT DOCUMENTS

| | | | | |
|---|---|---|---|---|
| 1,225,971 A | * | 5/1917 | Kester | A01M 3/02 43/137 |
| 1,344,943 A | | 6/1920 | Graham | |
| 1,380,090 A | * | 5/1921 | Williams | B25G 1/04 81/489 |
| 1,590,846 A | * | 6/1926 | Moore | A01M 3/02 D22/124 |
| 1,603,533 A | * | 10/1926 | Gatch | A01M 3/02 43/137 |
| 1,685,990 A | * | 10/1928 | Emanuel | A01M 3/02 D22/124 |
| 1,727,768 A | * | 9/1929 | Harley | A01M 3/02 43/137 |
| 1,885,730 A | | 11/1932 | Krag et al. | |
| 1,984,436 A | * | 12/1934 | Sarantos | A01M 3/02 43/137 |
| 1,991,836 A | * | 2/1935 | Bailey | A01M 3/02 43/137 |
| 2,189,360 A | | 2/1940 | Haviland | |
| 2,488,317 A | * | 11/1949 | Murray | A01M 3/02 156/280 |
| 3,412,501 A | * | 11/1968 | Rosen | A01M 3/02 43/137 |
| 4,120,114 A | | 10/1978 | Little et al. | |
| 4,154,545 A | * | 5/1979 | Pinto | B05C 17/0205 403/109.5 |

(Continued)

FOREIGN PATENT DOCUMENTS

GB 2360440 A * 9/2001 ............. A47G 21/02

OTHER PUBLICATIONS

Amazon.com: Heavy Duty Leather Fly Swatter (Jan. 20, 2022).

*Primary Examiner* — Timothy D Collins
*Assistant Examiner* — Maria E Graber
(74) *Attorney, Agent, or Firm* — Robert Moll (57) ABSTRACT

The invention relates to collapsible insect swatters, including a multi-sectional handle including a grip section and a whip section slidably and/or rotatably joined together on a common axis, wherein the whip section and grip section include a male end and female end that are secured during assembly and detached for disassembly of the handle, and a swatter of a top flapper secured to a bottom flapper that together form a sandwich secured to the end of the whip section, wherein the top flapper and the bottom flapper preferably include tongues that extend under or over windings on the whip section of the handle.

34 Claims, 5 Drawing Sheets

(56) References Cited

U.S. PATENT DOCUMENTS

| | | | | |
|---|---|---|---|---|
| 4,180,346 A | * | 12/1979 | Blake | F16B 7/14 |
| | | | | 24/122.3 |
| 4,242,828 A | | 1/1981 | Schurger et al. | |
| 4,617,754 A | | 10/1986 | Miley | |
| 4,651,464 A | | 3/1987 | Baker | |
| 4,653,222 A | | 3/1987 | Viscosi | |
| 4,793,646 A | * | 12/1988 | Michaud, Jr. | B63B 21/54 |
| | | | | 114/221 R |
| 4,910,909 A | | 3/1990 | Johnson et al. | |
| 5,108,114 A | * | 4/1992 | Marx | A63B 49/035 |
| | | | | 473/531 |
| 5,377,446 A | | 1/1995 | Dileo | |
| 5,630,290 A | | 5/1997 | Wade et al. | |
| 5,692,856 A | * | 12/1997 | Newman, Jr. | B25G 1/04 |
| | | | | 403/109.5 |
| D407,790 S | | 4/1999 | Miceli | |
| D415,814 S | | 10/1999 | Re | |
| 5,983,455 A | * | 11/1999 | Polzin | B05C 17/0205 |
| | | | | 15/144.4 |
| 6,055,767 A | | 5/2000 | Carter | |
| 6,182,539 B1 | * | 2/2001 | Webster | B25B 23/0021 |
| | | | | 81/177.2 |
| 6,213,672 B1 | * | 4/2001 | Varga | B25G 1/04 |
| | | | | 403/109.1 |
| 6,957,510 B1 | | 10/2005 | Kominkiewicz | |
| D538,133 S | * | 3/2007 | Richardson | D8/382 |
| 7,540,112 B1 | | 6/2009 | Crenshaw | |
| D618,758 S | | 6/2010 | Zvolanek | |
| 9,854,794 B1 | | 1/2018 | Hand | |
| D816,183 S | | 4/2018 | Mahiques | |
| D913,407 S | | 3/2021 | Mulvey | |
| D946,691 S | * | 3/2022 | Dai | D22/124 |
| 2006/0230581 A1 | * | 10/2006 | Richardson | B25G 1/04 |
| | | | | 16/429 |
| 2008/0190012 A1 | | 8/2008 | Chanthalangsy | |
| 2009/0106919 A1 | * | 4/2009 | Montgomery | A46B 7/04 |
| | | | | 15/144.3 |
| 2009/0272026 A1 | * | 11/2009 | Su | A01M 3/025 |
| | | | | 43/112 |
| 2010/0037511 A1 | * | 2/2010 | Schier | A01M 3/02 |
| | | | | 43/137 |
| 2013/0047498 A1 | * | 2/2013 | Keim, Jr. | A01M 3/04 |
| | | | | 43/136 |
| 2014/0366327 A1 | * | 12/2014 | Huang | B25G 1/10 |
| | | | | 16/421 |
| 2018/0184639 A1 | * | 7/2018 | Nasoulis | A01M 19/00 |

* cited by examiner

COLLAPSIBLE INSECT SWATTER

BACKGROUND

The invention relates to insect swatters, and specifically to a collapsible insect swatter with a multi-sectional handle useful in a variety of environments.

An insect swatter is a device used to kill insects, e.g., flies, mosquitoes, spiders, and other bugs. Insect swatters usually crush the insect against a solid surface. Some can try to kill an airborne insect by whipping the swatter through the air at high velocity. Whatever the technique, today's swatters do not work that great. Part of the problem is an inexpensive fly swatter may consist of a square of plastic or metal mesh attached to a wire handle. They can be flimsy, subject to breakage due to the repeated striking against hard surfaces, and so ugly they get stored away. Because they are stored away, people may spot an insect, run to grab the stored swatter, only to discover the insect has moved on. Now time is spent trying to locate the insect. Sometimes the insect simply flies out of reach, e.g., near the ceiling. But providing a longer swatter handle markedly increases the length of a shipping box and markedly increases the costs of what many expect should be a low-priced household item.

SUMMARY OF THE INVENTION

The invention relates to a collapsible insect swatter with a multi-sectional handle that reduces storage and shipping size requirements.

Each section of the multi-sectional handle has different properties. The grip section requires rigidity for control in operation, while the whip section requires slight flexibility to reduce the force transmitted to the user when striking the swatter against a solid surface.

In an embodiment, the invention provides a rigid grip section by a multilayered structure, including a first internal rod with a female end, a first reinforcement layer, a housing tube, and a grip wrap that surrounds the housing tube that surrounds the reinforcement layer that surrounds the first internal rod. An end cap is added to secure and protect the grip wrap at the end of the grip section.

In another feature, the invention provides a slightly flexible whip section by a different multilayered structure, including a second internal rod, a second reinforcement layer with tapered ends, an encasement wrap, and windings that surrounded the encasement wrap near the swatter attachment and surround the second reinforcement layers that surrounds the second internal rod.

In another feature, the invention provides a mechanism to detachably join the handle sections end-to-end along a common axis. For example, the whip section has a male end and a flapper end, while the grip section has a female end and an end cap. The male end slides with sufficient friction into and/or rotatably engages the female end for assembly to remain secured together during operation, but is readily detached for disassembly, e.g., for storage or shipping.

In another feature, the invention provides a weighty swatter that increases the striking force and a mechanism to secure the swatter to the handle over extensive use. In an embodiment, the invention provides windings that wrap around the handle to generate added frictional force to secure the handle to the swatter. Windings are preferred but not required. However, they do provide an inexpensive technique to secure the swatter to the whip section of the handle.

The invention also provides tongues extending from each of the top flapper and the bottom flapper to increase frictional contact with the windings. Stitching around the tongues forms a tight compressive sandwich to further secure the swatter to the handle.

DETAILED DESCRIPTION OF THE PREFERRED EMBODIMENTS

The following description includes the best mode of carrying out the invention. The detailed description illustrates the principles of the invention and should not be taken in a limiting sense. The scope of the invention is determined by the claims. Each part is assigned its own number in the specification and drawings.

Figure 1:
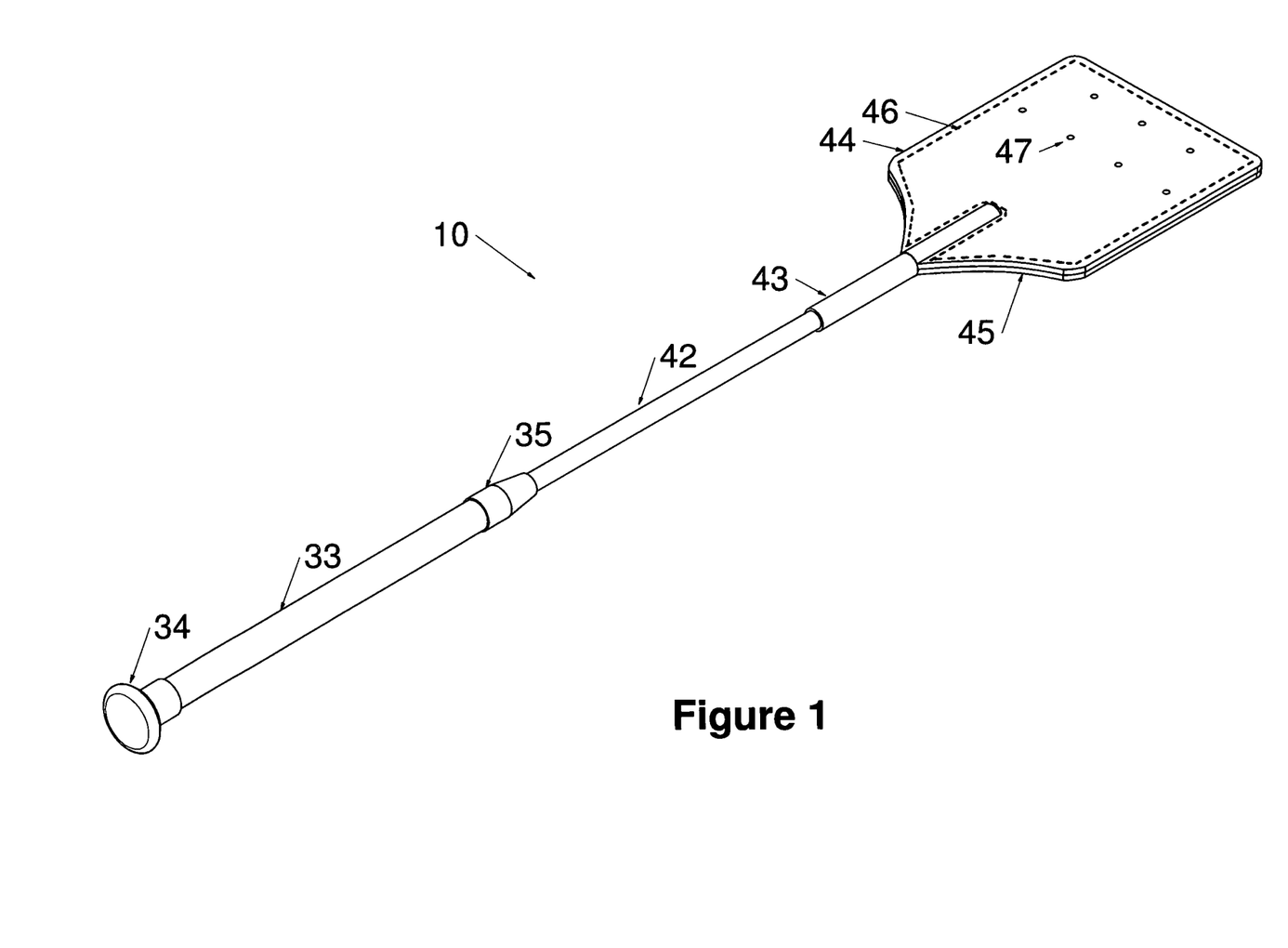
FIG. 1 is a perspective view of an embodiment of an insect swatter.

FIG. 1 is a perspective view of an embodiment of a collapsible insect swatter. As shown, the insect swatter 10 has a multi-sectional rod-shaped handle of a grip section joined to a whip section. The grip section is a rigid rod covered with grip wrap 33. An end cap 34 and a cone 35 cover the ends of the grip wrap 33. The whip section is a slightly flexible rod covered with an encasement wrap 42. The male end 41 and windings 43 cover ends of the encasement wrap 42. Stitching 46 secures a top flapper 44 to a bottom flapper 45 with vent holes (e.g., hole 47) to form a swatter that is secured to the whip section.

Figures 2A, 2B:
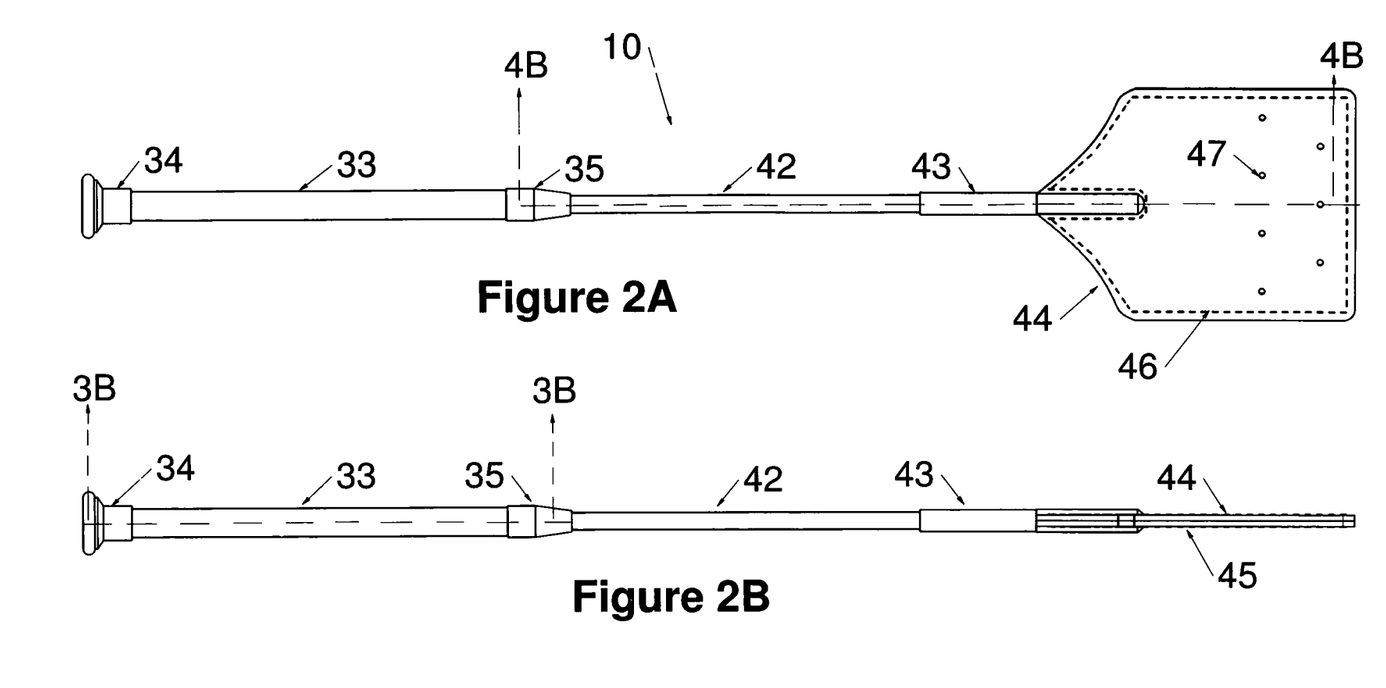
FIG. 2A is a top view of the insect swatter shown in FIG. 1.
FIG. 2B is a side view of the insect swatter shown in FIG. 1.
Figures 4A, 4B:
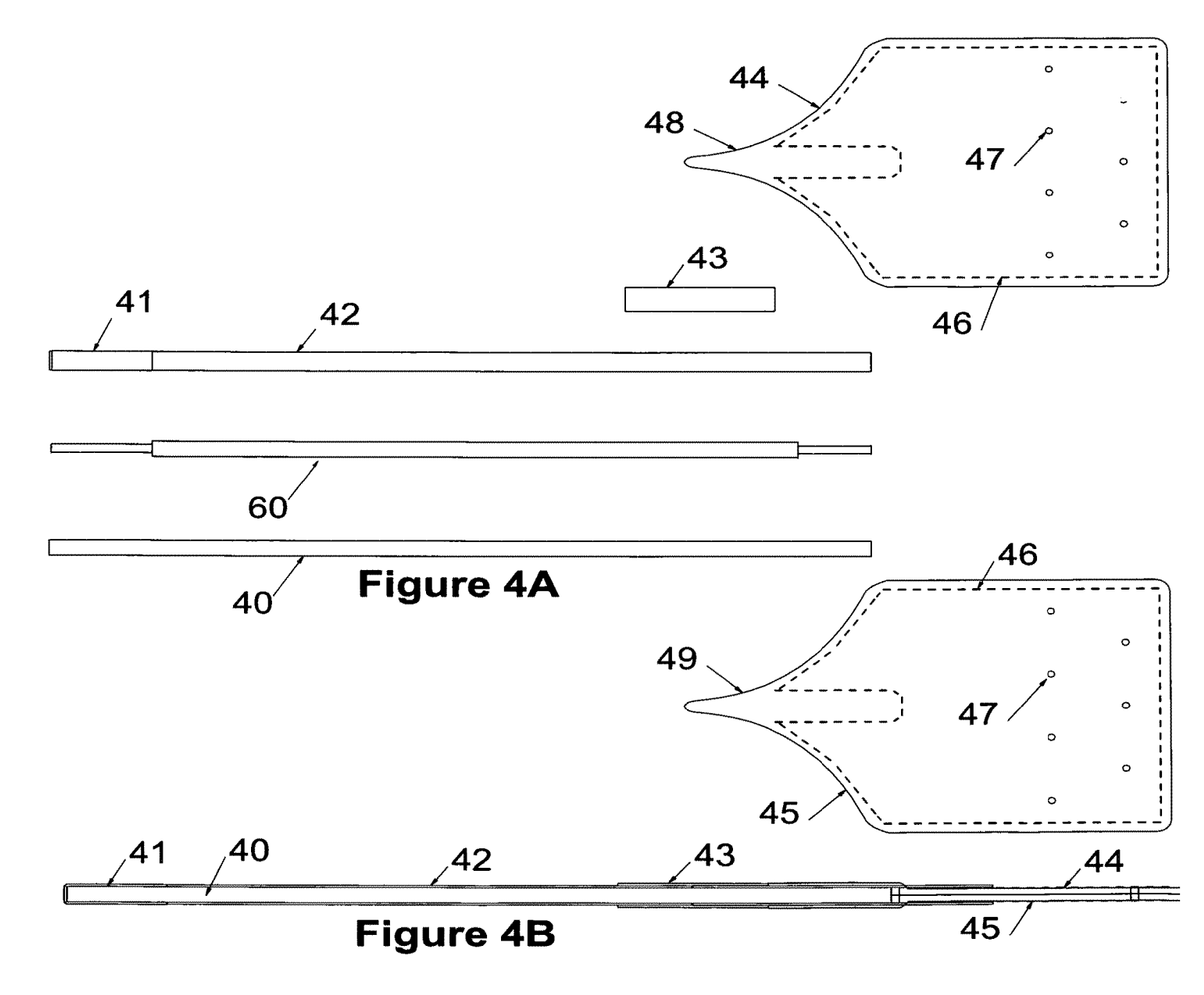
FIG. 4A illustrates the parts of the whip section of the handle.
FIG. 4B is a cross-sectional view of the grip section on line 4B-4B in FIG. 2A.

FIG. 2A is a top view of the insect swatter 10 shown in FIG. 1. FIG. 2A shows the same parts described in FIG. 1, plus the location of the cross-sectional line 4B-4B through the whip section as shown in FIG. 4B.

FIG. 2B is a side view of the insect swatter 10 shown in FIG. 1. FIG. 2B shows the same parts described in FIG. 1, plus the location of the cross-sectional line 3B-3B through the grip section as shown in FIG. 3B.

Figure 2C:
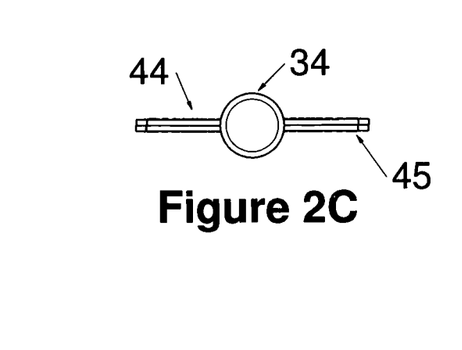
FIG. 2C is an end view of the handle end of the insect swatter.

FIG. 2C is an end view of the grip section, showing the end cap 34, the top flapper 44, and the bottom flapper 45 of the insect swatter 10.

Figure 2D:
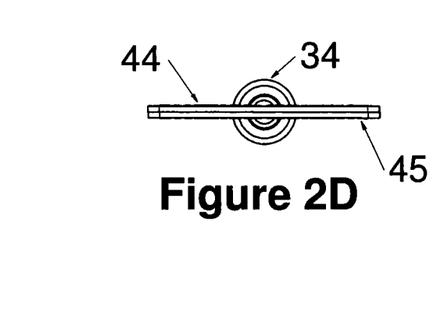
FIG. 2D is an end view of the swatter end of the insect swatter.

FIG. 2D is an end view of the swatter end, showing the end cap 34, the top flapper 44, and the bottom flapper 45 of the insect swatter 10.

Figure 3A:
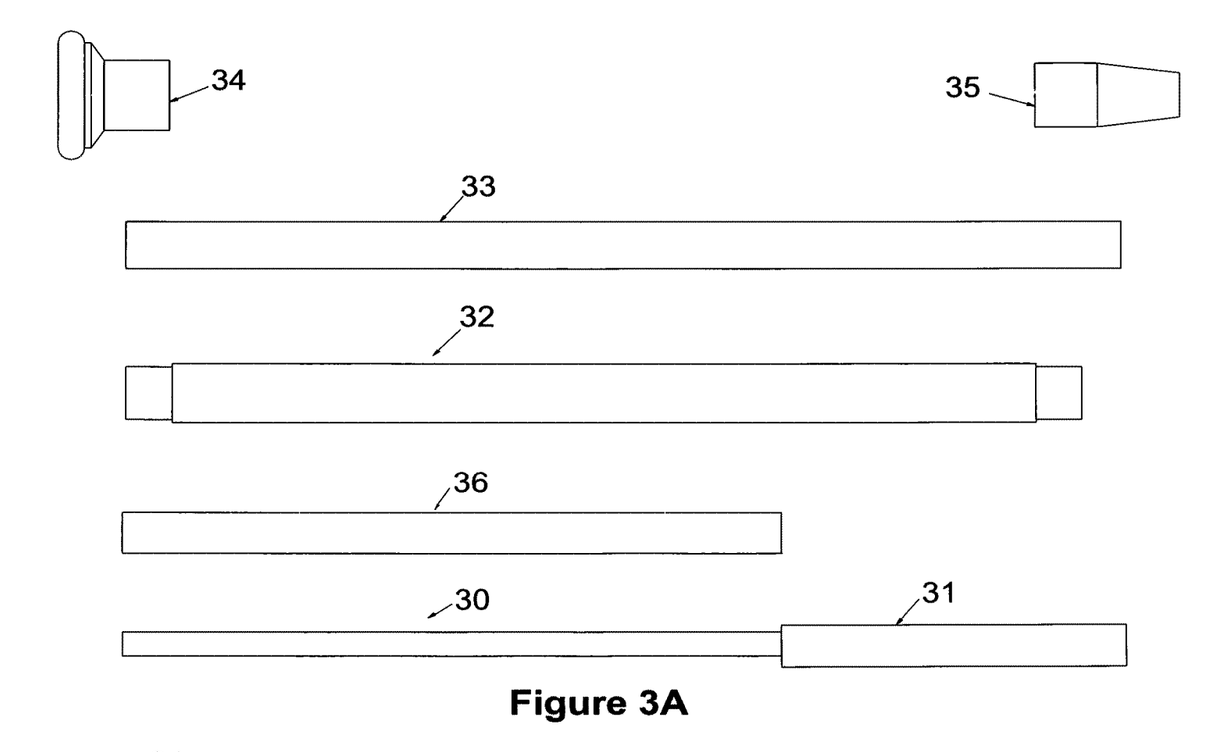
FIG. 3A illustrates the parts of the grip section of the handle.
Figure 3B:
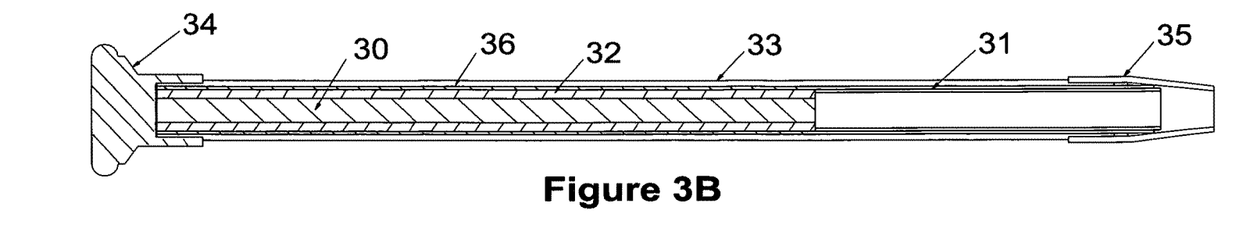
FIG. 3B is a cross-sectional view of the grip section on line 3B-3B in FIG. 2B.

FIG. 3A illustrates the individual parts of an embodiment of rigid multilayer grip section including a first internal rod 30 with a female end 31, a first reinforcement layer 36, and a housing tube 32 with tapered ends. FIG. 3B is a cross-sectional view of the grip section on line 3B-3B in FIG. 2B. It shows the assembly of the parts in FIG. 3A can be as follows:

(1) Coat the first internal rod 30 (e.g., fiberglass) with glue,
(2) Insert the first internal rod 30 into the first reinforcement layer 36 (e.g., plastic),
(3) Coat the exterior of the first reinforcement layer 36 with glue,
(4) Insert the first reinforcement layer 36 into the grip housing tube 32 (e.g., plastic),
(5) Coat the outside of female end 31 (e.g., metal) with glue,
(6) Insert the female end 31 into the housing tube 32,
(7) Wrap the housing tube 32 with grip wrap 33 (e.g., leather),
(8) Glue the cone 35 (e.g., metal) over the female end 31, and
(9) Glue the end cap 34 (e.g., metal) on the opposite end.

FIG. 4A illustrates a top flapper 44, including a tongue 48, stitching 46, and a representative vent hole 47. FIG. 4A also illustrates parts of the multilayer whip section, including a second internal rod 40, a housing tube 60 including a set of tapered ends, encasement wrap 42 with a male end 41, and windings 43. FIG. 4B is a cross-sectional view of the whip section on line 4B-4B in FIG. 2A. It shows the assembly of the parts in FIG. 4A can be as follows:

(1) Coat the second internal rod 40 (e.g., fiberglass) with glue,
(2) Insert the second internal rod 40 into the housing tube 60 (e.g., plastic),
(3) Slip encasement wrap 42 (e.g., nylon) over the housing tube 60,
(4) Cauterize both ends of the encasement wrap 42,
(5) On end of the encased encasement wrap 42 glue male end 41 (e.g., metal).
(6) Glue the top flapper 44 to the bottom flapper 45 (e.g., both leather),
(7) Insert the cauterized encased housing tube 60 between the flapper tongues 48 and 49,
(8) Use a common whipping knot to produce the windings 43 (e.g., nylon) to secure the flapper tongues 48, 49 to the encased housing tube 60, and
(9) Stitch flappers 44, 45 together and around encased housing tube 60.

In the last step of assembly, insert the male end 41 into the female end 31.

Figure 5A:
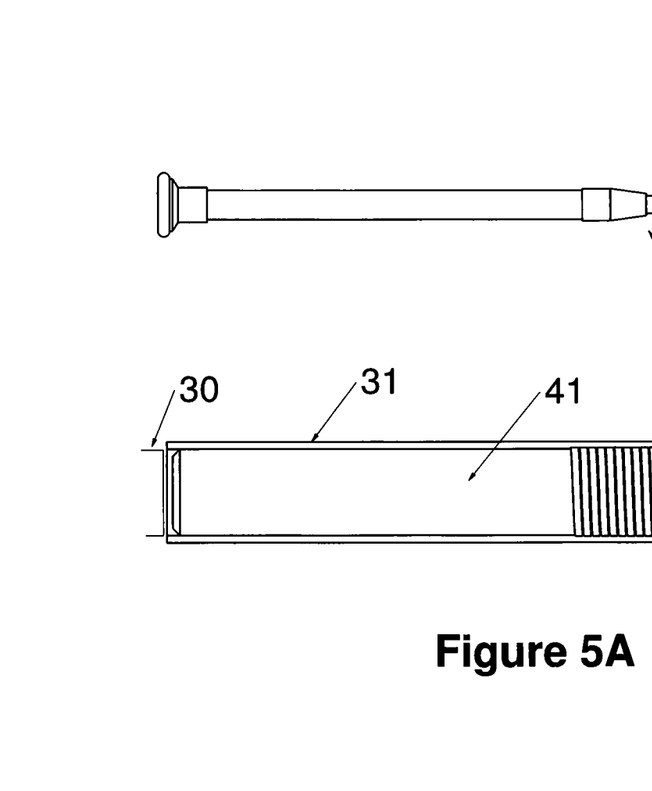
FIG. 5A is a close-up of the encasement wrap of the handle.
Figure 5B:
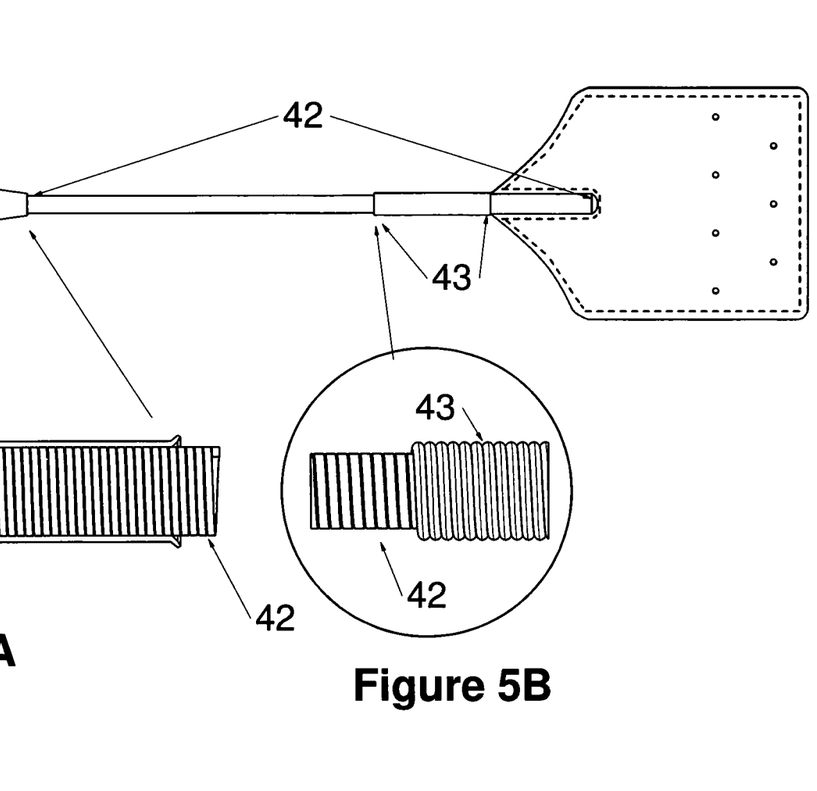
FIG. 5B is a close-up view of the windings of the handle.

FIGS. 5A-5B illustrate additional details and the relationship between the first internal rod 30, the female end 31, the male end 41, the encasement wrap 42, and the windings 43. In the illustrated embodiment, the encasement wrap 42 over the male end 41 produces additional friction with the inside walls of the female end 31. In an alternative embodiment, the encasement wrap 42 does not extend within the female end 31, because the male end 41 is a tight fit with sufficient friction with the female end 31. In another embodiment, the encasement wrap 42 further includes a set of threads that rotatably engage with the matching threads within the walls of the female end 31. In the various embodiments, the objective is to secure the grip section to the whip section for operation yet permit ready detachment of the grip section and whip section for storage and/or shipping of the insect swatter 10. The specification and drawings show an insect swatter 10 with preferably two sections (i.e., a grip section and a whip section), but the insect swatter can be comprised of a plurality of sections depending on the need of the user.

In addition, the securing mechanism preferably includes the cone 35, but the specification shows that the cone 35 is beneficial but not essential to securing the sections of the insect swatter 10. Finally, the specification describes materials none of which are essential, but adequate to enable one of ordinary skill in this field to make the insect swatter.

What is claimed:

1. A collapsible insect swatter, comprising:
a multi-sectional handle including a grip section and a whip section;
a slidable or rotatable mechanism to detachably join the grip section to the whip section end-to-end along a common axis, wherein the grip section includes a rigid multilayer structure for control in operation and the whip section includes a flexible multilayer structure to reduce the force transmitted to a user when striking the insect swatter against a solid surface, wherein the grip section rigid multilayer structure, includes:
a first internal rod with a female end,
a first reinforcement layer,
a first housing tube with tapered ends, and
a grip wrap that surrounds the housing tube that surrounds the first reinforcement layer that surrounds the first internal rod; and
a swatter comprising a top flapper secured to a bottom flapper that together form a sandwich secured to the end of the whip section.

2. The collapsible insect swatter of claim 1, wherein the whip section flexible multilayer structure, includes:
a second internal rod with a male end,
a second housing tube with tapered ends,
an encasement wrap with a male end, and
windings that surround the encasement wrap that surrounds the second housing tube that surrounds the second internal rod.

3. The collapsible insect swatter of claim 2, wherein the top flapper and the bottom flapper include tongues that extend under at least part of the windings on the whip section of the handle.

4. The collapsible insect swatter of claim 1, wherein the whip section includes a set of threads that rotatably engage with the matching threads of the grip section to secure the whip section to the grip section.

5. The collapsible insect swatter of claim 1, further comprising stitching to secure the top flapper and the bottom flapper along their perimeter, and along the whip section that extends into the top flapper and the bottom flapper.

6. The collapsible insect swatter of claim 1, wherein the whip section has a male end, the grip section has a female end, wherein the male end is slidably secured within the female end during assembly and slidably detached for disassembly of the handle.

7. The collapsible insect swatter of claim 1, wherein the whip section has a female end, the grip section has a male end, wherein the male end is slidably secured within the female end during assembly and slidably detached for disassembly of the handle.

8. The collapsible insect swatter of claim 1, further comprising an end cap that is secured over a tapered end of the grip wrap on the grip section to protect the grip wrap, and assist users on hand placement.

9. The collapsible insect swatter of claim 1, further comprising a truncated cone that houses and reinforces the place where the grip section and a whip section slidably join together.

10. A collapsible insect swatter, comprising:
a multi-sectional handle including a grip section and a whip section rotatably joined together on a common axis; and
a swatter comprising a top flapper secured to a bottom flapper that together form a sandwich secured to the end of the whip section, wherein the whip section has a male end, the grip section has a female end, wherein the male end is rotatably secured within the female end during assembly and rotatably detached for disassembly of the handle, wherein the grip section includes:
a first internal rod with a female end,
a first reinforcement layer,
a first housing tube with tapered ends, and
a grip wrap that surrounds the first housing tube that surrounds the reinforcement layer that surrounds the first internal rod.

11. The collapsible insect swatter of claim 10, wherein the whip section includes:
a second internal rod with a male end,
a second housing tube with tapered ends,
an encasement wrap with a male end, and
windings that surround the encasement wrap that surrounds the second housing tube that surrounds the second internal rod.

12. The collapsible insect swatter of claim 11, wherein the top flapper and the bottom flapper include tongues that extend under at least part of the windings on the whip section of the handle.

13. The collapsible insect swatter of claim 12, wherein the windings on the whip section extend onto the swatter to further secure the swatter to the whip section of the handle.

14. The collapsible insect swatter of claim 13, further comprising stitching to secure the top flapper and the bottom flapper along their perimeter, and along the whip section extending into the top flapper and the bottom flapper.

15. The collapsible insect swatter of claim 14, further comprising an end cap that is secured over a tapered end of the grip wrap on the grip section to protect the grip wrap, and assist hand placement.

16. The collapsible insect swatter of claim 15, further comprising a truncated cone that houses and reinforces the place where the grip section and a whip section slidably join together.

17. A collapsible insect swatter, comprising:
a multi-sectional handle including a grip section and a whip section slidably joined together on a common axis, wherein the whip section and grip section include a male end and female end that are slidably secured during assembly and slidably detached for disassembly of the handle;
a swatter comprising a top flapper secured to a bottom flapper that together form a sandwich secured to the end of the whip section, wherein the top flapper and the bottom flapper include tongues that extend under at least part of windings on the whip section of the handle; and
an end cap that is secured over a tapered end of a grip wrap on the grip section to protect the grip wrap and assist users on hand placement.

18. The collapsible insect swatter of claim 17, wherein the windings on the whip section extend into the swatter to further secure the swatter to the whip section of the handle and stitching secures the top flapper and the bottom flapper along their perimeter and along the whip section that extends into the top flapper and the bottom flapper.

19. A collapsible insect swatter, comprising:
a multi-sectional handle including a grip section and a whip section, slidably or rotatably joined together on a common axis;
a swatter of a top flapper secured to a bottom flapper that together form a sandwich secured to the end of the whip section;
wherein the whip section is a flexible multilayer structure, including:
a second internal rod with a male end,
a second housing tube with tapered ends,
an encasement wrap with a male end, and
windings that surround the encasement wrap that surrounds the second housing tube that surrounds the second internal rod; and
wherein the whip section includes (1) a set of threads that rotatably engage with the matching threads of the grip section to secure the whip section to the grip section, or (2) a female end, wherein the grip section has a male end, wherein the male end is slidably secured within the female end during assembly and slidably detached for disassembly of the handle.

20. A collapsible insect swatter, comprising:
a multi-sectional handle including a grip section and a whip section slidably joined together on a common axis;
a swatter comprising a top flapper secured to a bottom flapper that together form a sandwich secured to the end of the whip section,
wherein the whip section has a male end, the grip section has a female end, wherein the male end is slidably secured within the female end during assembly and slidably detached for disassembly of the handle,
wherein the grip section is a rigid multilayer structure, including:
a first internal rod with a female end,
a first reinforcement layer,
a first housing tube with tapered ends, and
a grip wrap that surrounds the first housing tube that surrounds the reinforcement layer that surrounds the first internal rod,
wherein the whip section is a flexible multilayer structure, including:
a second internal rod with a male end,
a second housing tube with tapered ends,
an encasement wrap with a male end, and
windings that surround the encasement wrap that surrounds the second housing tube that surrounds the second internal rod.

21. The collapsible insect swatter of claim 20, wherein the top flapper and the bottom flapper include tongues that extend under at least part of the windings on the whip section of the handle.

22. The collapsible insect swatter of claim 21, wherein the windings on the whip section extend onto the swatter to further secure the swatter to the whip section of the handle.

23. The collapsible insect swatter of claim 22, further comprising stitching to secure the top flapper and the bottom flapper along their perimeter, and along the whip section extending into the top flapper and the bottom flapper.

24. The collapsible insect swatter of claim 23, further comprising an end cap that is secured over a tapered end of the grip wrap on the grip section to protect the grip wrap, and assist hand placement.

25. The collapsible insect swatter of claim 24, further comprising a truncated cone that houses and reinforces the place where the grip section and a whip section slidably join together.

26. A collapsible insect swatter, comprising:
- a multi-sectional handle including a grip section and a whip section;
- a slidable or rotatable mechanism to detachably join the grip section to the whip section end-to-end along a common axis, wherein the grip section includes a rigid multilayer structure for control in operation and the whip section includes a flexible multilayer structure to reduce the force transmitted to a user when striking the insect swatter against a solid surface, wherein the whip section is a flexible multilayer structure, including:
- a second internal rod with a male end,
- a second housing tube with tapered ends,
- an encasement wrap with a male end, and
- windings that surround the encasement wrap that surrounds the second housing tube that surrounds the second internal rod; and
- a swatter comprising a top flapper secured to a bottom flapper that together form a sandwich secured to the end of the whip section.

27. The collapsible insect swatter of claim 26, wherein the top flapper and the bottom flapper include tongues that extend under at least part of the windings on the whip section of the handle.

28. The collapsible insect swatter of claim 26, wherein the whip section includes a set of threads that rotatably engage with the matching threads of the grip section to secure the whip section to the grip section.

29. The collapsible insect swatter of claim 26, further comprising stitching to secure the top flapper and the bottom flapper along their perimeter, and along the whip section that extends into the top flapper and the bottom flapper.

30. The collapsible insect swatter of claim 26, wherein the whip section has a male end, the grip section has a female end, wherein the male end is slidably secured within the female end during assembly and slidably detached for disassembly of the handle.

31. The collapsible insect swatter of claim 26, wherein the whip section has a female end, the grip section has a male end, wherein the male end is slidably secured within the female end during assembly and slidably detached for disassembly of the handle.

32. The collapsible insect swatter of claim 26, further comprising an end cap that is secured over a tapered end of a grip wrap on the grip section to protect the grip wrap, and assist users on hand placement.

33. The collapsible insect swatter of claim 26, further comprising a truncated cone that houses and reinforces the place where the grip section and a whip section slidably join together.

34. A collapsible insect swatter, comprising:
- a multi-sectional handle including a grip section and a whip section slidably joined together on a common axis, wherein the whip section and grip section include a male end and female end that are rotatably secured during assembly and rotatably detached for disassembly of the handle;
- a swatter comprising a top flapper secured to a bottom flapper that together form a sandwich secured to the end of the whip section, wherein the top flapper and the bottom flapper include tongues that extend on the whip section of the handle; and
- an end cap that is secured over a tapered end of a grip wrap on the grip section to protect the grip wrap, and assist users on hand placement.

* * * * *